Figure 1:
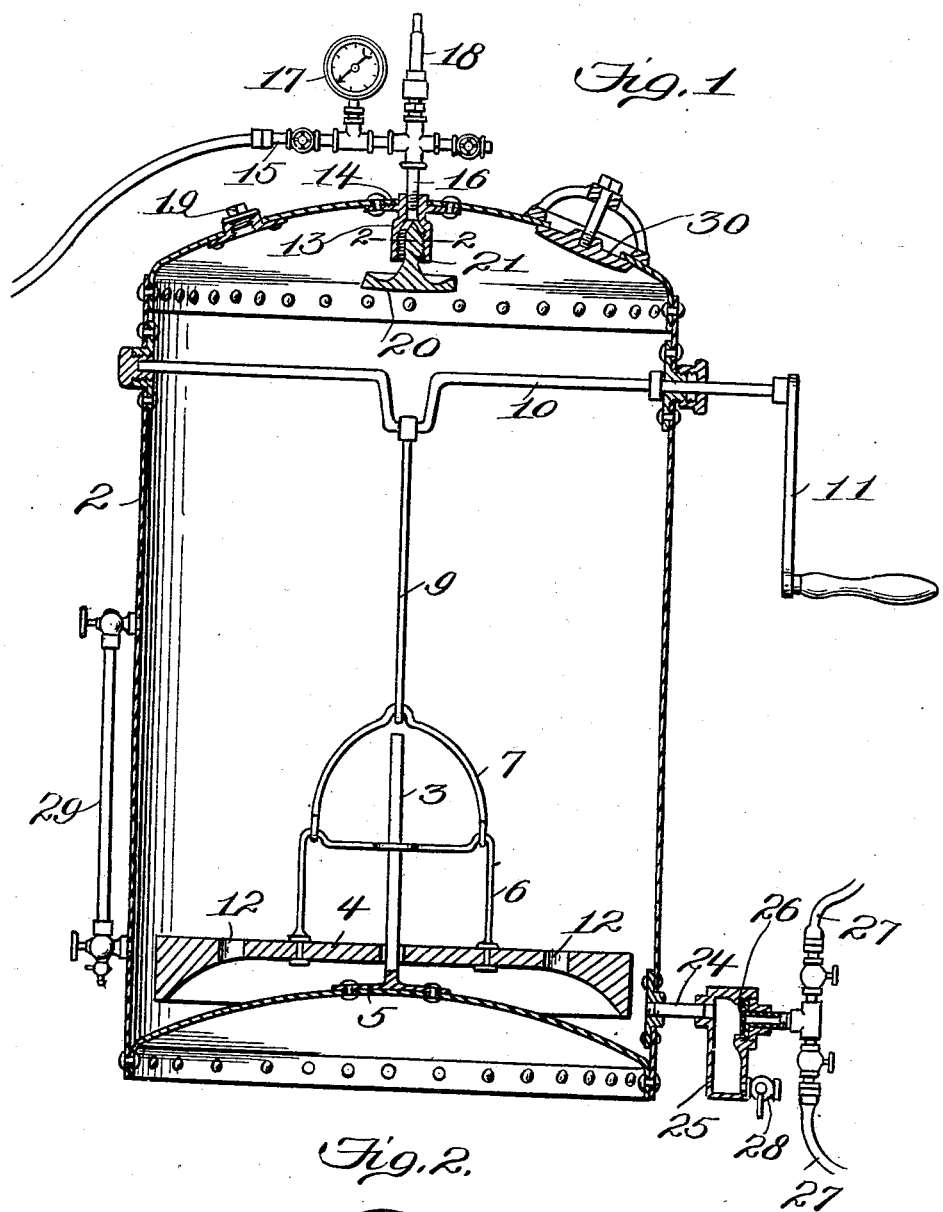

J. W. STEWART.
SPRAYING DEVICE.
APPLICATION FILED JAN. 15, 1908.

904,371.

Patented Nov. 17, 1908.

Witnesses:

Inventor
John W. Stewart
By James L. Norris.
Atty.

UNITED STATES PATENT OFFICE.

JOHN W. STEWART, OF MARTINSBURG, WEST VIRGINIA.

SPRAYING DEVICE.

No. 904,371.  Specification of Letters Patent.  Patented Nov. 17, 1908.

Application filed January 15, 1908. Serial No. 410,974.

*To all whom it may concern:*

Be it known that I, JOHN W. STEWART, a citizen of the United States, residing at Martinsburg, in the county of Berkeley and State of West Virginia, have invented new and useful Improvements in Spraying Devices, of which the following is a specification.

This invention relates to spraying devices. A spraying device involving my invention may be put to many advantageous uses, one of which is in the application of a chemical agent or germicide solution to plants, foliage etc.

Said device includes in its make-up a tank for containing the liquid to be sprayed and, while this liquid may be ejected from the tank in any suitable manner, I prefer to provide for the admission into the tank of a pressure fluid for such purpose and, while such pressure fluid may be of any desirable character, I prefer to employ carbonic acid gas as such. I admit this gas into the tank, but I prevent the initial mixture of the gas with the liquid in the tank as, in case there was at the outset or as soon as the gas was admitted into the tank such a mixture, the liquid would be carbonated, which I do not desire. To prevent such a possibility I prefer to change the course of the gas or to deflect its path in such a way as to primarily direct or divert it away from the surface of the liquid solution in the tank.

As another feature of the device I provide for the agitation of the solution in the tank.

The several features of the device, however, can be used individually or collectively in any one spraying device embracing the invention.

In the drawing accompanying and forming a part of this specification I show in detail one simple form of embodiment of the invention which, to enable those skilled in the art to practice the same, will be set forth at length in the following description, while the novelty of the invention will be included in the claims succeeding said description.

Figure 2:
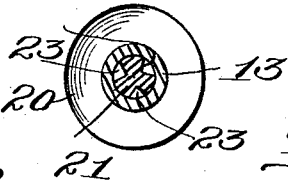

Referring to said drawing: Figure 1 is a vertical sectional view of a spraying device including said invention, and Fig. 2 is a sectional detail on the line 2—2 Fig. 1.

Like characters refer to like parts in both figures of the drawings.

The device shown in the drawings includes in its make-up a tank as 2. This tank may be made of any desirable material; it preferably will be made of some metal that will resist the expansive effects of a pressure medium such as carbonic acid gas. The tank is closed in the present case and is provided interiorly thereof with a pin or rod 3 represented as vertically disposed and as extending somewhat freely through a substantially central opening in an agitator as 4. The pin 3 is represented as having a widened or enlarged base portion or flange as 5 which can be riveted or otherwise suitably fastened to the bottom of the tank 2 in the latter. The pin 3 constitutes a convenient guide for the agitator 4 during the up and down motion thereof. I have shown as fastened to the upper side of the agitator and as rising therefrom a yoke as 6, and to this yoke is illustrated as loosely connected or pivoted a bail as 7. To the upper portion of the bail 7 I have represented as flexibly connected the lower end of a connecting rod or pitman as 9 similarly connected at its upper end with a crank shaft as 10 supported by bearings sustained by the body of the tank at diametrically opposite points, the crank shaft extending outside the casing and being provided at its outer extended end with a crank as 11 by revolving which the shaft 10 will be turned so as to vertically reciprocate the agitator 4 for the purpose of agitating the liquid in the tank or for mixing the ingredients of such liquid. Preferably the agitator 4 has only a limited vertical working movement and, when at the upper end of its stroke, is located below the surface of the liquid in the tank so as not to break or disturb the upper surface of such liquid or the portion thereof at the surface. The agitator has one or more perforations or holes as 12 for the passage of the liquid on the operation of said agitator.

The under side of the top of the tank 2 is represented as carrying a nipple or tube section 13 which may be externally flanged as at 14 for connection by rivets or otherwise with the under side of said top. This pipe connection, tube, or nipple 13 constitutes in the present instance the inlet for the pressure and liquid expelling agent into the tank. I have shown as leading toward the tank a pipe as 15 for the supply of the carbonic acid gas or equivalent substance, said pipe being represented as equipped with a downwardly-extending branch as 16 tapped or otherwise fitted into the upper end of the nipple 13, which upper end or portion extends, as shown, through the top of the tank 2. In connection with this pipe 15 I may provide a gage as 17 and a valve as 18 serving their customary functions. The tank 2 may also have an opening normally closed by a removable plug as 19, for the supply of the liquid to be sprayed, to said tank. I have shown as located in the tank a dished part as 20 having an upwardly extending stem as 21 tapped or otherwise suitably fitted into the lower enlarged portion of the nipple 13, said stem, shank, or stud 21 being furnished with several peripheral longitudinally-extending grooves as 23 for the passage of the carbonic acid gas or equivalent medium. Assuming that the outlet for the discharge of the spraying liquid is opened, the carbonic acid gas is admitted into the tank by way of the pipe 15, passing through the branch thereof into the nipple or tube 13, and flowing downwardly through the grooves or channels 23 against the dished member or disk 20. The latter constituting a diverter or deflector, changes the course of the gas and directs such fluid against the top of the tank, the fluid rebounding against the surface of the liquid in the tank and causing the expulsion of the latter through the liquid-discharge outlet. The dished disk or deflector therefore changes the path of the gas and prevents the initial admixture of such gas with the liquid in the tank and therefore the carbonation of such liquid. I am enabled, however, to use the full power of the gas to drive the liquid contents of the tank or vessel therefrom. During the action of the gas against the liquid the latter can be subjected to agitation, or agitation may occur at any other time.

Near the lower end of the tank 2 I have shown as connected a discharge pipe as 24 for the spraying liquid, such discharge pipe 24 being shown as intersected by a trap as 25 containing a strainer as 26 in the path of the liquid. Beyond the trap 25 the pipe 24 is equipped with valved branches as 27 which may consist in part of hose or other equivalent flexible device for the conduct of the spraying solution to a tree, plant, or any other part. The trap 25 is provided near the lower part and in a side thereof with a valved nipple as 28 the valve in which may be opened at intervals to draw off any sediment or other foreign matter that may be in said trap. The tank 2 externally thereof is provided with some suitable form of gage as 29 to indicate the level of the liquid in the tank and in its top may have a man-hole closed by the removable cap or cover 30 by removing which access may be had to the interior of the tank for cleaning, repairing, or other purposes.

What I claim is:

1. In a spraying device, a tank for containing liquid, having a discharge for such liquid and also having an inlet for the admission of a pressure fluid, and means mounted in fixed relation to said inlet for preventing the contact of such fluid with such liquid on the initial entrance of the fluid into the tank.

2. In a spraying device, a tank for containing liquid, having a discharge for such liquid and also having an inlet for the admission of a pressure fluid, means fixed relatively to the tank for preventing the contact of such fluid with such liquid on the initial entrance of the fluid into the tank irrespective of the level of the liquid therein, and means for agitating the liquid below its surface in said tank.

3. In a spraying device, a tank for containing liquid, having a discharge for such liquid and also having an inlet for the admission of a pressure fluid into said tank, and a deflector mounted in fixed relation and in alinement with said inlet for directing the fluid away from the liquid in the tank on the initial entrance of such liquid in said tank.

4. In a spraying device, a tank for containing liquid, having a discharge for such liquid and also having an inlet for the admission of a pressure fluid, and a disk forming a deflector immediately opposite to said inlet for directing said fluid toward the top of the tank on the entrance of said fluid into said tank to prevent the initial contact of the fluid and liquid.

5. In a spraying device, a tank for containing liquid, having a discharge for such liquid and also having a nipple extending into the tank through the top thereof for the admission of a pressure fluid into said tank, and a dished member provided with a longitudinally-channeled stem fitted into said nipple, the channels of the stem forming fluid passages which lead to the dished portion of said member, said dished member being located in the tank and serving to direct said fluid toward the top of the tank on the initial entrance thereof into said tank.

6. In a spraying device, a tank for containing liquid, a pin connected to the bottom of said tank, an agitator having a perforation to receive said pin, a yoke on the agitator coöperating also with said pin to thereby guide the agitator, and means for operating said agitator.

7. In a spraying device, a tank for containing liquid, a pin in the tank connected to and rising from the bottom thereof, a reciprocatory agitator guided by said pin, a yoke connected to and rising from the agitator, a bail flexibly connected to the yoke, a rod flexibly connected with said bail, and a rotary crank shaft supported by the tank and flexibly connected with said rod.

In testimony whereof I have hereunto set my hand in presence of two subscribing witnesses.

JOHN W. STEWART.

Witnesses:
   H. H. EMMERT,
   W. C. KILMER.